United States Patent [19]
Croell

[11] Patent Number: 5,149,571
[45] Date of Patent: Sep. 22, 1992

[54] LICENSE PLATE

[76] Inventor: Richard C. Croell, 134 Willow Pl., Broomfield, Colo. 80020

[21] Appl. No.: 596,053

[22] Filed: Oct. 11, 1990

[51] Int. Cl.⁵ .............................................. A61F 13/02
[52] U.S. Cl. .......................................... 428/40; 428/41; 428/43; 428/137; 428/178; 428/187; 428/914; 40/200; 40/206; 40/209; 40/625; 40/626; 40/630; 40/661; 40/910
[58] Field of Search ................. 40/661, 625, 626, 630, 40/200, 206, 209, 159, 910, 615; 428/40, 41, 42, 137, 172, 187, 914

[56] References Cited

U.S. PATENT DOCUMENTS

| | | | |
|---|---|---|---|
| 2,400,079 | 5/1946 | Ducey | 40/200 |
| 2,610,421 | 9/1952 | Horn | 40/661 |
| 3,069,793 | 12/1962 | Francescon | 40/2.2 |
| 4,246,307 | 1/1981 | Trautwein | 428/43 |
| 4,270,287 | 6/1981 | Gimbel | 40/209 |
| 4,324,421 | 4/1982 | Moraw et al. | 283/7 |
| 4,429,015 | 1/1984 | Sheptak | 428/201 |
| 4,510,006 | 4/1985 | Lawson | 428/40 |
| 4,749,084 | 6/1988 | Pereyra | 206/459 |
| 4,807,807 | 2/1989 | Glick | 428/41 |
| 4,810,544 | 3/1989 | Hickman | 40/661 |
| 4,874,226 | 10/1989 | McDonald | 428/542.2 |
| 4,917,928 | 4/1990 | Heinecke | 428/41 |

FOREIGN PATENT DOCUMENTS

| | | | |
|---|---|---|---|
| 2748708 | 5/1979 | Fed. Rep. of Germany | 40/200 |
| 2026750 | 2/1980 | United Kingdom. | |
| 2203721 | 10/1988 | United Kingdom | 40/661 |

*Primary Examiner*—Ellis P. Robinson
*Assistant Examiner*—Nasser Ahmad
*Attorney, Agent, or Firm*—H. Kenneth Johnston, II

[57] ABSTRACT

A multi ply laminae which provides weather resistance, tamper resistance and is a sturdy and legible temporary license plate. A printed serialized plate is affixed by a pressure sensitive adhesive to the upper portion of a transparent polymeric sheet by removing the protective liner and affixing the back of the plate to the polymeric sheet. An expiration date is applied to the face of the plate and the protective liner is removed from the bottom portion of the transparent polymeric sheet and and the bottom portion of the transparent polymeric sheet is folded along a perforated portion centered on the transparent polymeric sheet sealing the upper portion to the bottom portion forming the temporary plate which is attached to a motor vehicle through the retention receptors in any conventional manner.

10 Claims, 2 Drawing Sheets

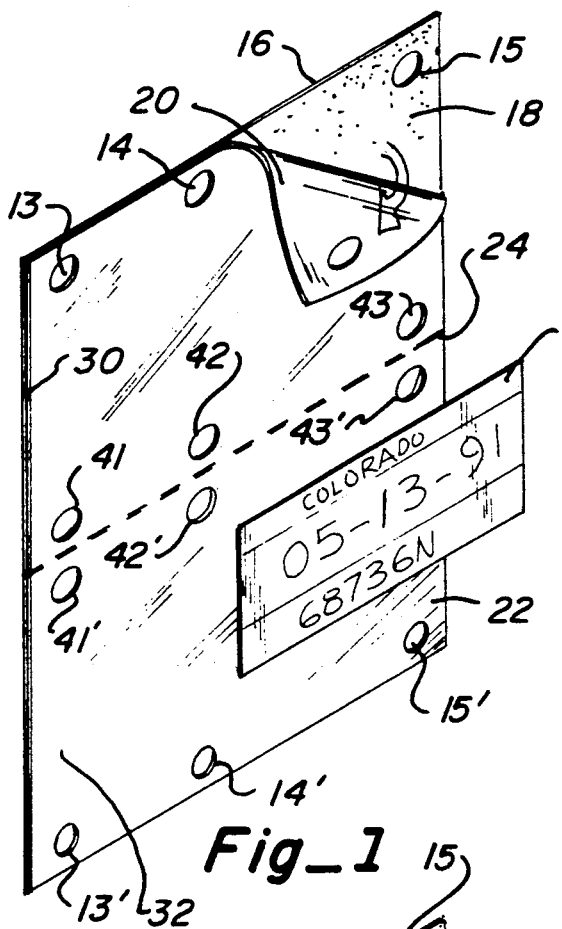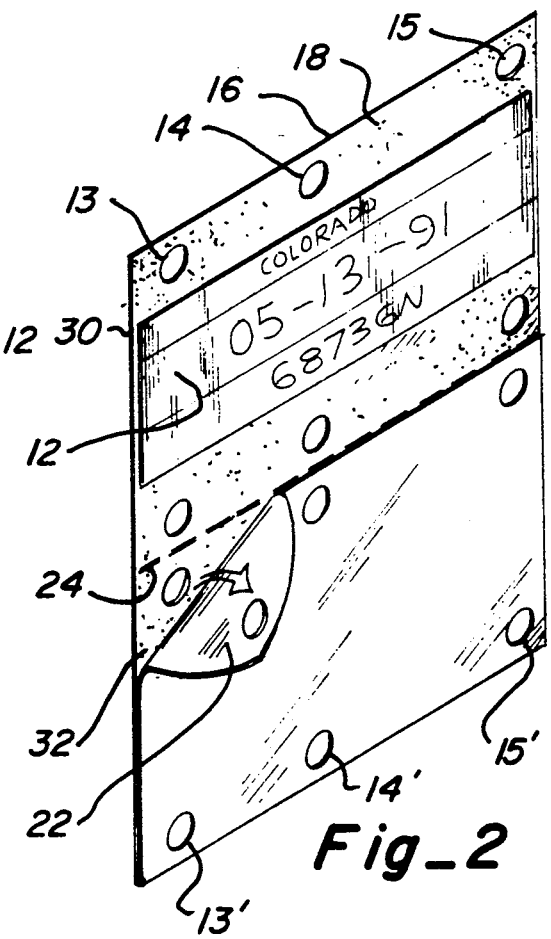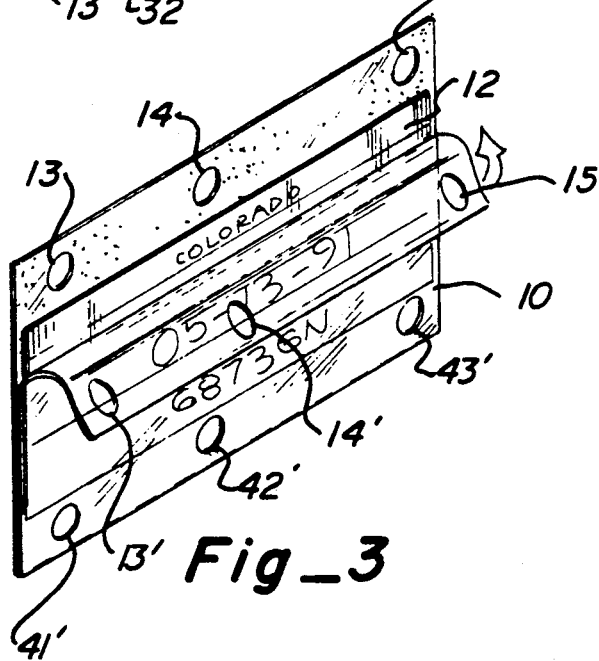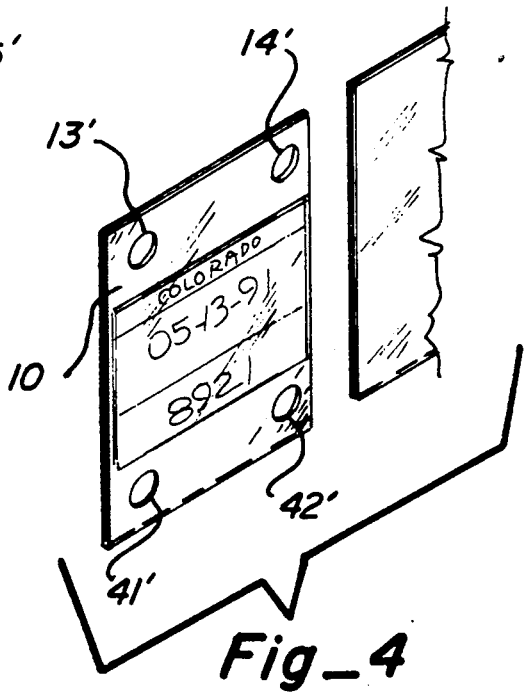

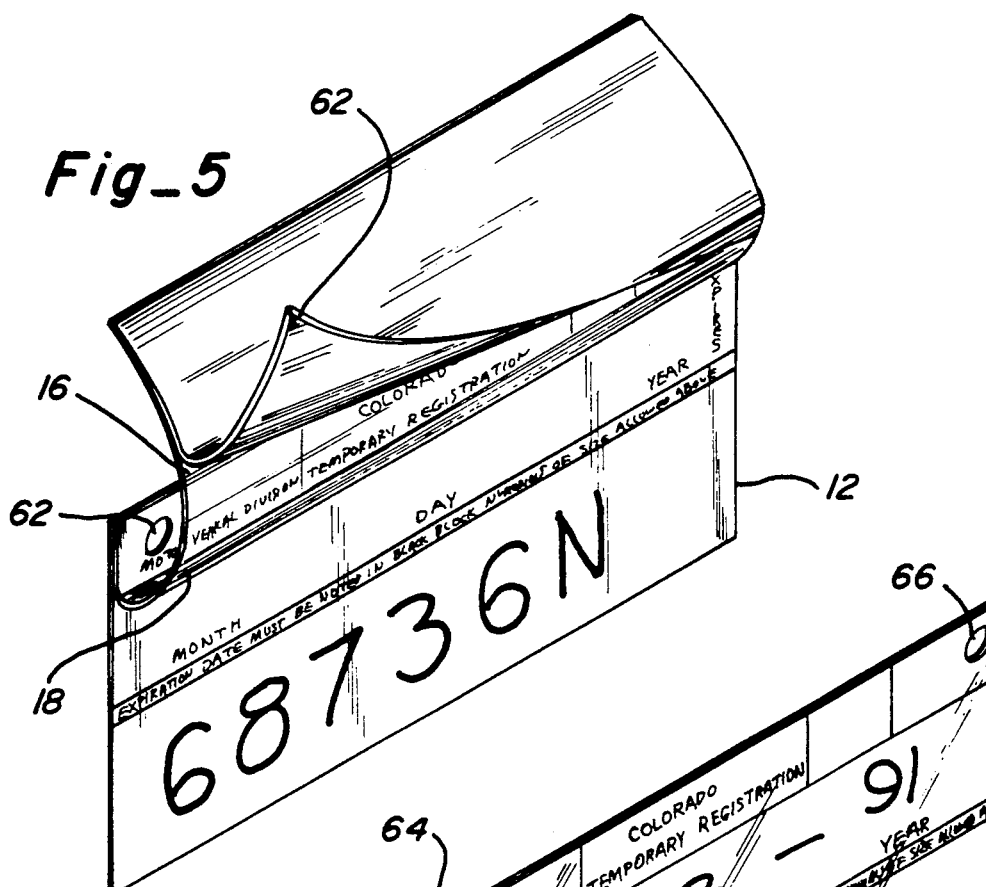
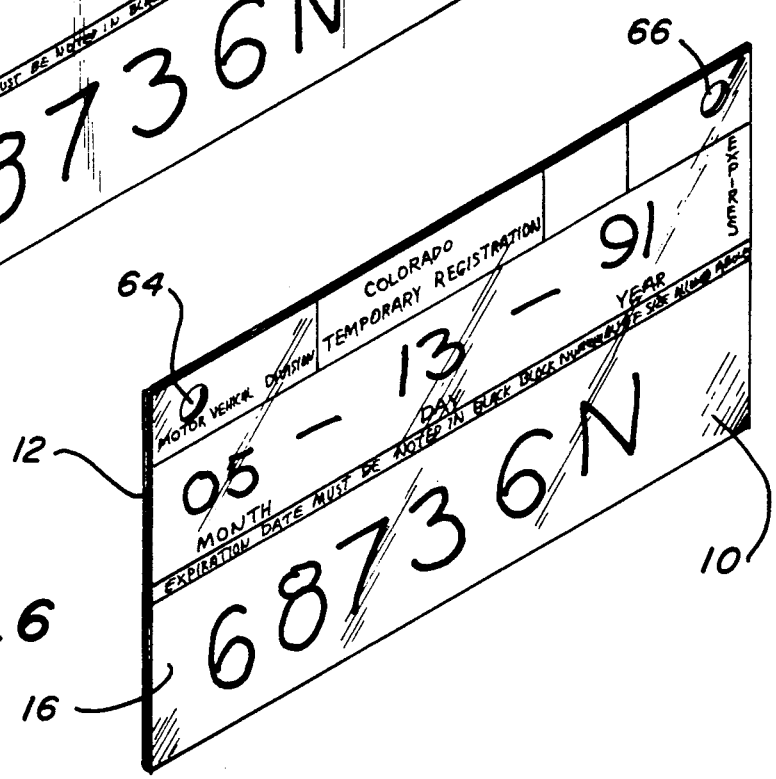
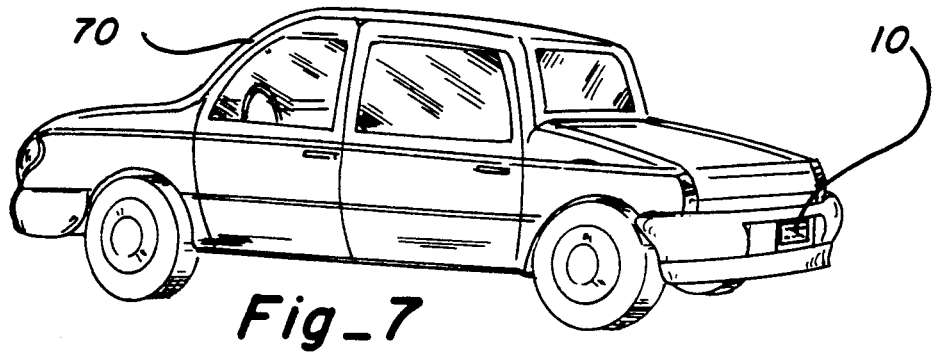

LICENSE PLATE

BACKGROUND OF THE INVENTION

This invention relates to a weather resistant, tamper resistant, sturdy and legible temporary license plate.

License plates have been the same way since the first metal plate was manufactured in prison. The inmates continue to make the plates by stamping them out of metal by changing the alpha numeric character for each different plate. The process is slow and quite expensive. The various states also have temporary plates or stickers which allows an individual to drive a new purchased vehicle for a limited period of time prior to purchasing the permanent plate. Different states utilize various types of temporary permits for these newly purchased vehicles. These methods vary from adhesive faced stickers which are many times improperly affixed to windows of the vehicle allowing the expiration date to be altered or making it difficult to determine the validity of the temporary permit by an individual in a passing patrol vehicle. In Colorado, a flimsy paper permit is placed into a plastic sleeved cover with a heavy backed paper insert and is then closed with a clip similar to a paper clip. The permit is easily removed and the expiration date altered denying the state revenue for the time the vehicle is driven without valid permanent plates. The plastic sleeve further causes distortion to the viewer and allows moisture into the permit making it difficult to read and causes havoc to a permit being used legitimately.

Currently, in Colorado at least, when a new or used vehicle is purchased, a dealer fills in the expiration date on the temporary sticker and attaches the temporary plate to the vehicle as previously indicated.

Other states utilize adhesive faced stickers which are attached to the window of a automobile and many times are applied improperly allowing them to be altered or illegible from view.

Accordingly it would be desirable to provide an inexpensive weather resistant, tamper resistant, sturdy and legible license plate which could replace either the permanent metal plate or the temporary sticker.

SUMMARY OF THE INVENTION

This invention involves a tamper resistant, weather resistant, sturdy and legible license plate which comprises a transparent polymeric sheet having a coating of pressure sensitive adhesive with a protective release liner such as kraft paper on the top portion and bottom portion which is separated by a perforation running the width of the sheet approximately centered on the sheet allowing the polymeric sheet to be easily folded and a sturdy printable plate which can be permanently printed on and written on to indicate the plate number and the expiration date. The plate may also have all the pertinent information printed thereon. The license plate is formed when the protective liner is removed from the transparent polymeric sheet and the serialized plate is affixed by centering it on the top portion of the transparent polymeric sheet and folding the bottom portion of the transparent polymeric sheet over the face of the serialized plate sealing it from the weather and from tampering. The within invention would replace the temporary stickers and the metal plates currently being used.

DESCRIPTION OF THE DRAWINGS

FIG. 1 is a plan view of the unassembled license plate.

FIG. 2 is a plan view of the license plate partially assembled.

FIG. 3 is a plan view of the assembled license plate.

FIG. 4 is a plan view of the assembled license plate for a motorcycle.

FIG. 5 is a plan view of the license plate partially assembled.

FIG. 6 is a plan view of the assembled license.

FIG. 7 is a perspective of the license plate in use on a vehicle.

DESCRIPTION OF THE PREFERRED EMBODIMENTS

With reference to FIG. 1, a plate or temporary permit 12 capable of receiving and retaining print is shown with a transparent polymeric sheet 16 having a pressure sensitive adhesive 18 bonded thereto and a upper protective liner 20 on its upper half and a lower protective liner 22 on its lower half. Perforation 24 separate the upper portion 30 and the bottom portion 32 allowing easy separate removal of the upper and lower protective liner 20 and 22 respectively from upper portion 30 and bottom portion 32.

Upper protective liner 20 is removed from the upper portion 30 exposing the pressure sensitive adhesive 18 as shown in FIG. 1. Plate 12 is then centered on the upper portion 30 permanently affixing the plate 12 to the transparent polymeric sheet 16 as shown in FIG. 2. The expiration date is placed on the plate 12 and the lower protective liner 22 is removed from bottom portion 32 and the bottom portion 32 is folded along perforation 24 and is permanently affixed to the face of plate 12 and upper portion 30 by pressure sensitive adhesive 18 sealing and protecting the plate 12 as shown in FIG. 3.

Upper portion 30 has upper and lower retention receptacles 13, 14, 15 and 41, 42, 43 respectively and bottom portion 32 has retention receptacles 13', 14', 15, and 41', 42', 43', respectively as shown in FIG.'s 1, 2, and 3.

When upper portion 30 and bottom portion 32 are folded together as shown in FIG.'s 3 and 4, retention receptacles 13, 14, 15, 41, 42, 43, and 13', 14', 15', 41', 42', 43, mate allowing the license plate 10 to be mounted on an automobile using the retention receptacles 13, 13', 15, 15', 41, 41, and 43, 43'. When the license plate 10 is to be mounted on a motorcycle, retention receptacles 13, 13', 14, 14', 41, 41', and 42, 42, are utilized and the excess transparent polymeric sheet 16 is removed by conventional means as shown in FIG. 4. In another embodiment of the within invention plate 12 has a transparent polymeric sheet 16 adhered to upper edge of plate 12 in a manner that allows the polymeric sheet to be lifted and day, month, and year expiration may be hand written on to the face of plate 12. Transparent polymeric sheet 16 has a releasable protective liner 62 affixed to the transparent polymeric sheet 16 having a coating of a pressure sensitive adhesive 18. Transparent polymeric sheet 16 and plate 12 have coinciding retention receptacles 64 and 66 for attaching directly to a vehicle as shown in FIG. 6. Protective liner 60 is removed and transparent polymeric sheet 16 is affixed to plate 12 forming the completed license plate as shown in FIG. 6. The license plate 10 may be affixed to the vehicle 70 as shown in FIG. 7.

Although this plate could be made by applying two separate transparent sheets to the front and back of a plate, and would be considered an equivalent, the within described embodiment is the preferred embodiment.

Various modifications and alterations of this invention will become apparent to those skilled in the art without departing from the scope and spirit of this invention, and it should be understood that this invention is not to be unduly limited to the illustrative embodiments set forth herein.

What I claim is:

1. A sturdy multi ply laminae weather and tamper resistant license plate consisting essentially of:

a plate means;

said plate means having a front side capable of receiving printed and written indicia thereon;

a transparent polymeric sheet means having a front side and a back side and an upper portion and a lower portion where said upper portion and said lower portion are the same dimensions as said plate means;

said back side of said transparent polymeric sheet means covered with an adhesive means;

a protective liner means releasably affixed to said adhesive means on said upper portion and said lower portion;

said upper portion and said lower portion are equally divided by a fold means extending the width of said upper portion and said lower portion permitting said protective liner means to be removed from said upper portion and said lower portion separately;

said transparent polymeric sheet means having a multiple retention receptor means on said upper portion and said lower portion;

whereby said protective liner means on said upper portion is removed exposing said adhesive means and affixing said plate means centeredly on said upper portion and removing said protective liner means from said lower portion, exposing said adhesive means on said lower portion and folding said lower portion along said fold means and affixing said lower portion to said plate and said upper portion so that said retention receptor means on said upper portion and lower portion match forming said license plate attachable to a vehicle.

2. The adhesive means of claim 1 wherein said adhesive means is a pressure sensitive adhesive.

3. The protective liner means of claim 1 wherein said protective liner mean sis a release liner means.

4. The release liner means of claim 3 wherein said release liner means is a kraft paper.

5. The fold means of claim 1 wherein said fold means is a perforation means.

6. The fold means of claim 1 wherein said fold means is a crease.

7. A multi-ply laminae tamper resistant license plate consisting essentially of:

a plate means;

said plate means having a front side capable of receiving printed and written indicia thereon;

said plate means having an upper edge portion having an attachment means thereon and a lower portion;

a transparent polymeric sheet means having a front side and a back side the same dimensions as said plate means having an upper edge portion having an attachment means therein corresponding to said plate means and a lower portion;

said upper edge portion is affixed correspondingly to said front side of said plate means;

said lower portion of said back side of said transparent polymeric sheet means having an adhesive means thereon;

a protective liner means releasably affixed to said adhesive means;

whereby in operation, an expiration date is placed on said front side of said plate means and said protective liner is removed from said adhesive means and said transparent polymeric sheet means is permanently affixed to said plate means forming said license plate attachable to a vehicle.

8. The adhesive means of claim 7 wherein said adhesive means is a pressure sensitive adhesive.

9. The protective liner means of claim 7 wherein said protective liner means is a release liner means.

10. The release liner means of claim 9 wherein said release liner means is a kraft paper.

* * * * *